Aug. 27, 1968  D. L. WHITE ET AL  3,398,600

MOTION TRANSMITTING REMOTE CONTROL ASSEMBLY

Filed Oct. 10, 1966

INVENTORS
Daniel L. White, &
Peter A. Stahr

Barnard, McElynn & Rising
ATTORNEYS

United States Patent Office 3,398,600
Patented Aug. 27, 1968

3,398,600
MOTION TRANSMITTING REMOTE
CONTROL ASSEMBLY
Daniel L. White, Birmingham, and Peter A. Stahr, Detroit, Mich., assignors to Teleflex, Incorporated, North
Wales, Pa., a corporation of Delaware
Filed Oct. 10, 1966, Ser. No. 585,635
12 Claims. (Cl. 74—501)

ABSTRACT OF THE DISCLOSURE

A motion transmitting remote control assembly which is normally manually operated to control a device or control element by transmitting tension or compression in a curved path by means of a flexible motion transmitting core element and, more specifically, to an improved snap-in male terminal means for the ends of such core elements.

---

Motion transmitting remote control assemblies of the type to which the instant invention pertains usually include a guide comprising a conduit with fittings disposed adjacent each end thereof for attaching the conduit to a support structure, and a motion transmitting core element, which is normally a wire-like member, movably disposed in the conduit with the ends extending from each end of the conduit. One end of the core element is usually moved manually and the other end is adapted to be attached to a control element of a device to be controlled; although in many instances, both ends of the core element are attached to mechanical devices.

Such remote control assemblies are utilized in land vehicles, airplanes and marine craft. Typical of the use of such remote control assemblies is the utilization in automobiles to control remotely disposed valves in the heating, cooling and ventilating system for an area adjacent the instrument panel. A typical manner in which the core element has been attached to control elements in the past is by shaping the end of the wire-like core element into one or more loops so that the loops are disposed on the control element with the control element extending into the hole formed by the loops. Frequently, the devices controlled by such remote control assemblies are very sensitive to movement. Any looseness of the loops on the control element allows relative movement between the core element and the control element and therefore does not provide the required sensitivity. One solution to the problem which has been utilized in the prior art is to mold a plastic terminal on the end of the core element with a hole extending therethrough for receiving the control element. This tends to reduce lost motion between the core element and the control element because the tolerances of the hole in the plastic terminal molded on the end of the conduit can be accurately controlled. However, the control element tolerances frequently vary so that even if the tolerances of the hole in the plastic terminal are maintained, lost motion still occurs. In addition, it is difficult and expensive to provide the desired tolerances in the hole of the plastic terminal.

Accordingly, it is an object and feature of this invention to provide a motion transmitting remote control assembly including a guide movably supporting a motion transmitting core element with a male terminal means of organic polymeric material molded in mechanical interlocking engagement with the core element and adapted for snap-in attachment to a control element such that the tolerances of both the control element and the male terminal means need not be accurately controlled.

Another object and feature of this invention is to provide a motion transmitting remote control assembly including a guide for movably supporting a motion transmitting core element with a male terminal means of organic polymeric material disposed in mechanical interlocking engagement with the core element and including a resilient snap-in means may be disposed in a hole in a control element and expands to fit snugly within the hole to prevent lost motion between the core element and the control element.

In general, these and other objects and features of this invention may be attained in a preferred embodiment wherein the motion transmitting remote control assembly includes a guide comprising a conduit with fittings secured to the conduit for attachment of the conduit to a support structure, and a motion transmitting core element movably supported within the conduit. The motion transmitting core element is preferably formed of a wire-like element having an irregularly-shaped portion at one end. A male terminal means of organic polymeric material is disposed in mechanical interlocking engagement with the irregularly-shaped portion of the core element and is adapted for snap-in attachment to a control element. The male terminal means includes a body portion with a recess portion adjacent the body portion and a conically tapered portion extending from the recess portion on the opposite side from the body portion. A slot extends inwardly into the recess from the extremity of the conically tapered portion to allow the segments of the conically tapered portion formed thereby to move together when the male terminal means is inserted into a control element. The male terminal means is inserted into a control element to the point where the control element is disposed in the recess between the conically tapered portion and the body portion to retain the male terminal means in attachment with the control element and to allow a minimum of lost motion between the core element and the control element.

Other objects and attendant advantages of the present invention will be readily appreciated as the same becomes better understood by reference to the following detailed description when considered in connection with the accompanying drawings wherein.

Figure 1:
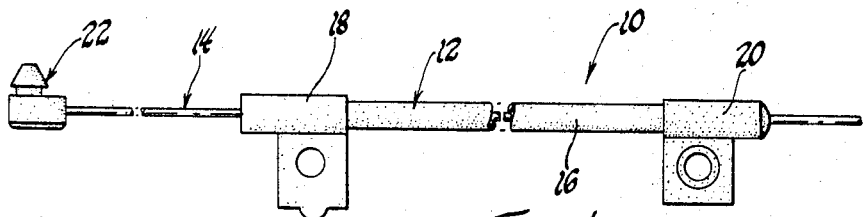
FIGURE 1 is a view of a preferred embodiment of the motion transmitting remote control assembly of the instant invention.
Figure 2:
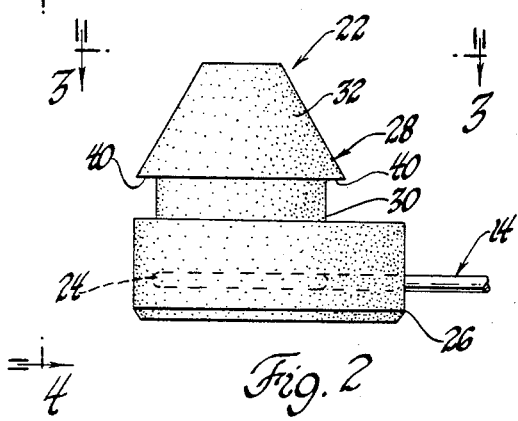
FIGURE 2 is an enlarged view of the male terminal means shown in FIGURE 1.
Figure 3:
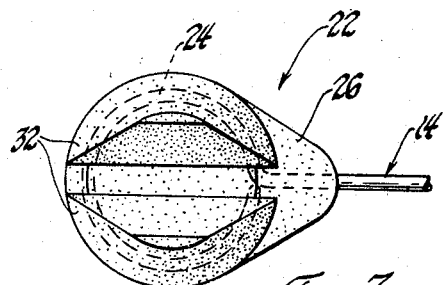
FIGURE 3 is a view taken substantially along line 3—3 of FIGURE 2.

Referring now to the drawings, wherein like numerals indicate like or corresponding parts throughout the several views, a preferred embodiment of the motion transmitting remote control assembly of the instant invention is generally shown at 10 in FIGURE 1. The motion transmitting remote control assembly 10 includes a guide, generally indicated at 12, and a motion transmitting core element, generally indicated at 14.

The guide 12 includes a conduit 16 which has a bore extending therethrough for movably supporting the motion transmitting core element 14. Preferably, the surface of the bore within the conduit 16 is of organic polymeric low friction material. The guide means 12 also includes means for attaching the conduit 16 to a support structure comprising the fittings 18 and 20. In addition, the outer surface of the conduit 16 is also preferably made of an organic polymeric material. The fittings 18 and 20 are preferably made of organic polymeric material and molded about the conduit 16.

Generally indicated at 22 is a male terminal means disposed on the core element 14 and adapted for snap-in attachment to a control element. The other end of the core element 14 (not shown) is normally adapted to be manually controlled but may also utilize a terminal means 22. The control element to which the terminal means 22 is attached may be an input member or an output member. The male terminal means 22 is normally molded about a non-uniformly or irregularly-shaped portion of the core element 14, the irregularly-shaped portion being disclosed as at least one loop 24, i.e., the loop may be partial or extend anywhere up to approximately 350°. Hence, the male terminal means 22 is molded into mechanical interlocking engagement with the loop 24. Of course, instead of the loop 24, a corrugated or otherwise irregularly-shaped portion of the core element may be utilized.

The male terminal means 22 includes a body portion 26 which is teardrop in shape. The male terminal means 22 also includes resilient snap-in means, generally indicated at 28, which extend from the body portion 26 for insertion into and retainment in engagement with an aperture in a control element.

Figure 4:
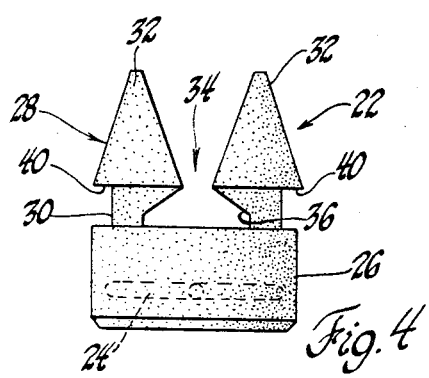
FIGURE 4 is a view taken substantially along line 4—4 of FIGURE 2.
Figure 5:
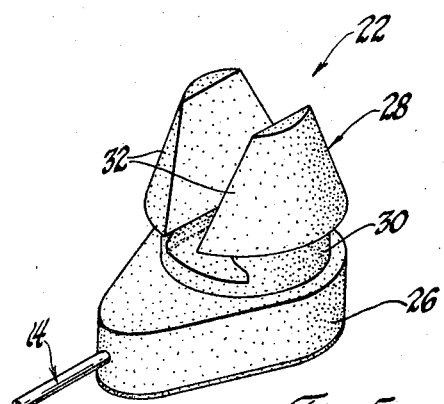
FIGURE 5 is a perspective view of the male terminal means illustrated in FIGURES 1 through 4.

More specifically, the resilient snap-in means 28 includes an annular recess portion 30 disposed adjacent the body portion 26 and a tapered portion 32 disposed on the opposite side of the recess portion 30 from the body portion 26. Thus, the tapered portion 32 may be inserted into an aperture in a control element to the point where the control element is disposed and retained in the recess portion 30. The recess portion 30 is annular and the tapered portion 32 is conically tapered and includes a slot, illustrated in FIGURE 4, which extends inwardly from the outward extremity of the tapered portion 32 and into the recess portion 30 to divide the tapered portion into segments so that each of the segments of the tapered portion may move together when being snapped into engagement with the control element. As best illustrated in FIGURE 4, the slot 34 as viewed in cross section is defined by a pair of planes which converge toward one another in a direction inwardly toward the recess portion 30 from the outward extremity of the tapered portion 32. In addition, the slot 34 as viewed in cross section further includes the enlarged portion 36 in the recess portion 30. Thus, the tapered portion 32 may be inserted into an aperture so that the segments of the tapered portion 32 move together as allowed by the slot 34 until the control element is disposed in the recess portion 30 whereupon the segments of the tapered portion 32 move apart so that the recess portion 30 snugly engages the aperture in the control element, thus preventing any significant lost motion between the core element and the control element. The male terminal means 22 is retained in engagement with the control element because, upon the moving apart of the segments of the tapered portion 32, the shoulders 40 engage the control element.

Figure 6:
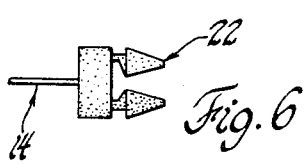
FIGURE 6 is a view showing an alternative for the relative disposition between the male terminal means of the instant invention and the motion transmitting core element.
Figure 7:
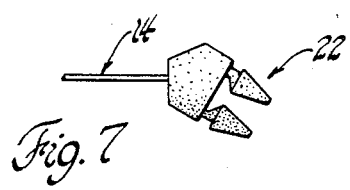
FIGURE 7 is a view showing yet another alternative for the relative disposition between the male terminal means of the instant invention and the motion transmitting core element.

In the embodiment illustrated in FIGURES 1 through 5, the conically tapered portion 32 is disposed about an axis which is substantially perpendicular to the longitudinal axis of the core element 14. However, there is illustrated in FIGURE 6 an alternative embodiment wherein the conically tapered portion is disposed about an axis which is substantially parallel to the longitudinal axis of the core element. In yet another embodiment, which is disclosed in FIGURE 7, the conically tapered portion is disposed about an axis which crosses the longitudinal axis of the core element 14.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly comprising: a guide, a flexible motion transmitting core element movably supported by said guide, and male terminal means for snap-in attachment to a control element and disposed on said core element.

2. A motion transmitting remote control assembly as set forth in claim 1 wherein said core element includes an irregularly shaped portion and said male terminal means is organic polymeric material in mechanical interlocking engagement with said irregularly shaped portion of said core element.

3. A motion transmitting remote control assembly as set forth in claim 2 wherein said male terminal means includes a body portion and resilient snap-in means extending from said body portion for being inserted into and retained in engagement with the control element.

4. A motion transmitting remote control assembly as set forth in claim 3 wherein said resilient snap-in means includes a recessed portion adjacent said body portion and a tapered portion on the opposite side of said recessed portion from said body portion whereby said tapered portion may be inserted into the control element to the point where the control element is disposed and retained in said recessed portion.

5. A motion transmitting remote control assembly as set forth in claim 4 wherein said recessed portion is annular and said tapered portion is conically tapered and including a slot extending inwardly from the extremity of said tapered portion and into the recessed portion to divide said tapered portion into segments for allowing the segments of said tapered portion to move together when being snaped into engagement with the control element.

6. A motion transmitting remote control assembly as set forth in claim 5 wherein said slot as viewed in cross section is defined by a pair of planes which converge toward one another in a direction inwardly toward said recessed portion from the extremity of said tapered portion.

7. A motion transmitting remote control assembly as set forth in claim 6 wherein said slot as viewed in cross section further includes an enlarged portion in said recessed portion.

8. A motion transmitting remote control assembly as set forth in claim 5 wherein said conical tapered portion is disposed about an axis which is substantially perpendicular to the longitudinal axis of said core element.

9. A motion transmitting remote control assembly as set forth in claim 5 wherein said conical tapered portion is disposed about an axis which is substantially parallel to the longitudinal axis of said core element.

10. A motion transmitting remote control assembly as set forth in claim 5 wherein said conical tapered portion is disposed about an axis which crosses the longitudinal axis of said core element.

11. A motion transmitting remote control assembly as set forth in claim 5 wherein said guide includes a conduit with a bore therethrough for movably supporting said core element, and means for attaching said conduit to a support structure, and said core element comprises a wire.

12. A motion transmitting remote control assembly as set forth in claim 11 wherein said irregularly shaped portion of said core element comprises at least one loop.

References Cited

UNITED STATES PATENTS

| | | | |
|---|---|---|---|
| 2,553,025 | 5/1951 | Weber et al. | 74—502 |
| 2,933,942 | 4/1960 | Boylan et al. | 74—501 X |
| 2,976,512 | 3/1961 | Vallee. | |
| 3,101,205 | 8/1963 | Benham | 285—162 |
| 3,164,054 | 1/1965 | Biesecker. | |
| 3,231,300 | 1/1966 | Moroney. | |
| 3,253,480 | 5/1966 | Fernberg | 74—501 |
| 3,289,491 | 12/1966 | Conrad | 74—501 |

FOREIGN PATENTS 604,078   6/1948   Great Britain.

FRED C. MATTERN, Jr., *Primary Examiner.*

C. F. GREEN, *Assistant Examiner.*